(12) United States Patent
Pelzel (10) Patent No.: US 9,485,969 B2
(45) Date of Patent: Nov. 8, 2016

(54) AIR DIRECTING ASSEMBLY FOR A BEEKEEPING SMOKER ASSEMBLY

(71) Applicant: Kenneth Pelzel, Greenwich, CT (US)

(72) Inventor: Kenneth Pelzel, Greenwich, CT (US)

( * ) Notice: Subject to any disclaimer, the term of this patent is extended or adjusted under 35 U.S.C. 154(b) by 86 days.

(21) Appl. No.: 14/173,132

(22) Filed: Feb. 5, 2014

(65) Prior Publication Data

US 2014/0215899 A1    Aug. 7, 2014

Related U.S. Application Data

(60) Provisional application No. 61/761,529, filed on Feb. 6, 2013.

(51) Int. Cl.
*A01K 55/00*    (2006.01)

(52) U.S. Cl.
CPC ..................... *A01K 55/00* (2013.01)

(58) Field of Classification Search
CPC ....................................................... A01K 55/00
USPC .................................................... 43/128, 127
See application file for complete search history.

(56) References Cited

U.S. PATENT DOCUMENTS

| | | | | |
|---|---|---|---|---|
| 199,611 | A * | 1/1878 | Bingham | A01M 1/2066 43/127 |
| 739,510 | A * | 9/1903 | Root | 43/128 |
| 1,386,283 | A * | 8/1921 | Shrader | 43/128 |
| 2,697,427 | A | 12/1954 | Rigali | |
| 4,615,138 | A * | 10/1986 | Cale | 43/128 |
| 2005/0262756 | A1 | 12/2005 | Younger | |
| 2011/0078944 | A1 | 4/2011 | Stearns | |

\* cited by examiner

*Primary Examiner* — Marc Burgess
(74) *Attorney, Agent, or Firm* — McCarter & English, LLP (57) ABSTRACT

Improved air directing assemblies are provided. More particularly, the present disclosure provides improved air directing assemblies for use with beekeeping smoker assemblies or the like. The present disclosure provides for an air directing assembly that provides or blows a constant, continuous and/or directed stream of air into and/or to a smoker assembly, thereby providing a sufficient/adequate and/or improved amount of smoke to the bees, which thereby keeps the bees calm when the hive is open by the user. The air directing assemblies of the present disclosure prevent the fire in a smoker assembly from going out, and they can replace the pumps/bellows typically associated with smoker assemblies. These improved air directing assemblies can be modified to mount with respect to and/or be utilized with a wide variety of smoker assemblies or the like.

17 Claims, 6 Drawing Sheets

AIR DIRECTING ASSEMBLY FOR A BEEKEEPING SMOKER ASSEMBLY

CROSS-REFERENCE TO RELATED APPLICATIONS

This application claims the benefit of U.S. Provisional Application No. 61/761,529 filed Feb. 6, 2013, all of which is herein incorporated by reference in its entirety.

BACKGROUND

1. Technical Field

The present disclosure relates to air directing assemblies, and more particularly, to air directing assemblies for beekeeping smoker assemblies or the like.

2. Background Art

In general, when a user is inspecting an insect hive (e.g., honeybee hive), the user may first desire to provide smoke (e.g., via a smoker assembly) to the insects (e.g., bees) before opening the hive. However, the fire in some smoker assemblies can go out if the bellows/pumps of the smoker assemblies are not continuously pumped. In general, if not enough smoke is produced or provided (e.g., by the smoker assembly), then the honeybees or insects can become agitated.

Thus, an interest exists for improved air directing assemblies for beekeeping smoker assemblies or the like, and related methods of use. These and other inefficiencies and opportunities for improvement are addressed and/or overcome by the assemblies, systems and methods of the present disclosure.

SUMMARY

The present disclosure provides advantageous air directing assemblies. More particularly, the present disclosure provides improved air directing assemblies for beekeeping smoker assemblies or the like. In exemplary embodiments, the present disclosure provides for an air directing assembly that provides or blows a constant, continuous and/or directed stream of air into and/or to a smoker assembly, thereby providing a sufficient/adequate and/or improved amount of smoke to the bees, which thereby keeps the bees calm when the hive is open by the user.

In certain embodiments, the advantageous air directing assemblies of the present disclosure prevent the fire in a smoker assembly from going out, and they can replace the pumps/bellows typically associated with smoker assemblies. As noted, the pumps/bellows of smoker assemblies need to be constantly pumped, otherwise the fire in the smoker assembly can go out. In exemplary embodiments, the air directing assemblies of the present disclosure can be modified to mount with respect to and/or be utilized with a wide variety of smoker assemblies, as discussed further below.

The present disclosure provides for an air directing assembly for a beekeeping smoker assembly including a housing including: (i) an upper wall having a top surface and a bottom surface, the upper wall having an aperture extending through the top and bottom surfaces, and (ii) at least one side wall extending from the upper wall to a position below the bottom surface; an air chute member mounted with respect to the top surface of the upper wall, the air chute member mounted proximal to the aperture of the upper wall; and an air moving member mounted with respect to the bottom surface of the upper wall, the air moving member mounted proximal to the aperture of the upper wall; wherein the air moving member is configured and dimensioned to provide a stream of air through the aperture and to the air chute member; and wherein the air chute member is configured and dimensioned to provide a directed stream of air to an inlet of a smoker assembly.

The present disclosure also provides for an air directing assembly for a beekeeping smoker assembly wherein the air moving member is a fan. The present disclosure also provides for an air directing assembly for a beekeeping smoker assembly wherein the housing includes four side walls that extend from the upper wall, the four side walls defining a substantially rectangular side wall arrangement.

The present disclosure also provides for an air directing assembly for a beekeeping smoker assembly wherein the upper wall is configured and dimensioned to allow at least a portion of the smoker assembly to be mounted thereon. The present disclosure also provides for an air directing assembly for a beekeeping smoker assembly wherein at least one side wall extends from the upper wall to a position above the top surface to define a top-side extending portion, the top-side extending portion including at least one groove or recess configured and dimensioned to allow at least a portion of the smoker assembly to be mounted or housed therein.

The present disclosure also provides for an air directing assembly for a beekeeping smoker assembly wherein the at least one side wall includes one or more apertures therethrough. The present disclosure also provides for an air directing assembly for a beekeeping smoker assembly wherein an inner surface of the at least one side wall includes a mounting member configured and dimensioned to releasably secure or house a power source. The present disclosure also provides for an air directing assembly for a beekeeping smoker assembly further including a power source releasably secured or housed with respect to the mounting member.

The present disclosure also provides for an air directing assembly for a beekeeping smoker assembly wherein the power source is a battery. The present disclosure also provides for an air directing assembly for a beekeeping smoker assembly wherein the power source is mounted with respect to the air moving member and is configured and adapted to provide power to the air moving member. The present disclosure also provides for an air directing assembly for a beekeeping smoker assembly wherein the power source is a 9-volt battery; and wherein the air moving member is a 12-volt fan.

The present disclosure also provides for an air directing assembly for a beekeeping smoker assembly wherein the housing is fabricated from a heat resistant material. The present disclosure also provides for an air directing assembly for a beekeeping smoker assembly further including a power switch mounted with respect to the housing, the power switch configured and adapted to control power to the air moving member. The present disclosure also provides for an air directing assembly for a beekeeping smoker assembly wherein the smoker assembly is a beekeeping smoker assembly.

The present disclosure also provides for a method for directing air to a beekeeping smoker assembly including providing a housing having: (i) an upper wall having a top surface and a bottom surface, the upper wall having an aperture extending through the top and bottom surfaces, and (ii) at least one side wall extending from the upper wall to a position below the bottom surface; mounting an air chute member with respect to the top surface of the upper wall, and mounted proximal to the aperture of the upper wall; and mounting an air moving member with respect to the bottom surface of the upper wall, and mounted proximal to the aperture of the upper wall; providing a stream of air via the air moving member through the aperture and to the air chute member; and providing a directed stream of air via the chute member to an inlet of a smoker assembly.

The present disclosure also provides for a method for directing air to a beekeeping smoker assembly wherein the air moving member is a fan. The present disclosure also provides for a method for directing air to a beekeeping smoker assembly wherein the upper wall is configured and dimensioned to allow at least a portion of the smoker assembly to be mounted thereon; and wherein at least one side wall extends from the upper wall to a position above the top surface to define a top-side extending portion, the top-side extending portion including at least one groove or recess configured and dimensioned to allow at least a portion of the smoker assembly to be mounted or housed therein.

The present disclosure also provides for a method for directing air to a beekeeping smoker assembly wherein an inner surface of the at least one side wall includes a mounting member configured and dimensioned to releasably secure or house a power source; and further comprising a power source releasably secured or housed with respect to the mounting member; and wherein the power source is mounted with respect to the air moving member and is configured and adapted to provide power to the air moving member.

The present disclosure also provides for a method for directing air to a beekeeping smoker assembly wherein the power source is a 9-volt battery; and wherein the air moving member is a 12-volt fan.

The present disclosure also provides for a method for directing air to a beekeeping smoker assembly further including a power switch mounted with respect to the housing, the power switch configured and adapted to control power to the air moving member; and wherein the smoker assembly is a beekeeping smoker assembly.

Any combination or permutation of embodiments is envisioned. Additional advantageous features, functions and applications of the disclosed assemblies, systems and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various steps, features and combinations of steps/features described below and illustrated in the figures can be arranged and organized differently to result in embodiments which are still within the spirit and scope of the present disclosure. To assist those of ordinary skill in the art in making and using the disclosed systems, assemblies and methods, reference is made to the appended figures, wherein.

DETAILED DESCRIPTION

The exemplary embodiments disclosed herein are illustrative of advantageous air directing assemblies, and systems of the present disclosure and methods/techniques thereof. It should be understood, however, that the disclosed embodiments are merely exemplary of the present disclosure, which may be embodied in various forms. Therefore, details disclosed herein with reference to exemplary air directing assemblies/fabrication methods and associated processes/techniques of assembly and/or use are not to be interpreted as limiting, but merely as the basis for teaching one skilled in the art how to make and use the advantageous air directing assemblies of the present disclosure.

The present disclosure provides improved air directing assemblies. In general, the present disclosure provides improved air directing assemblies for use with beekeeping smoker assemblies or the like. The present disclosure provides for an air directing assembly that provides or blows a constant, continuous and/or directed stream of air into and/or to a smoker assembly, thereby providing a sufficient/adequate and/or improved amount of smoke to the bees, which thereby keeps the bees calm when the hive is open by the user.

The advantageous air directing assemblies of the present disclosure prevent the fire in a smoker assembly from going out, and they can replace the pumps/bellows typically associated with smoker assemblies. The exemplary air directing assemblies of the present disclosure can be modified to mount with respect to and/or be utilized with a wide variety of smoker assemblies.

Current practice provides that the pumps/bellows of smoker assemblies need to be constantly pumped, otherwise the fire in the smoker assembly can go out. This can create situations where there is not enough smoke produced/provided by the smoker assembly, and then the honeybees or insects can become agitated. In short, the fire in some smoker assemblies can go out if the bellows/pumps of the smoker assemblies are not continuously pumped.

In exemplary embodiments, the present disclosure provides for improved air directing assemblies that direct a continuous and/or directed stream of air into and/or to a smoker assembly, thereby providing an adequate and/or improved amount of smoke to the bees, and which thereby provides a significant operational, commercial and/or manufacturing advantage as a result. In short, the advantageous air directing assemblies of the present disclosure provide insect inspectors (e.g., honeybee inspectors) with a convenient way to apply a continuous stream of smoke into or to an insect hive (e.g., honeybee hive) during inspections or the like.

Referring now to the drawings, like parts are marked throughout the specification and drawings with the same reference numerals, respectively. Drawing figures are not necessarily to scale and in certain views, parts may have been exaggerated for purposes of clarity.

Figure 1:
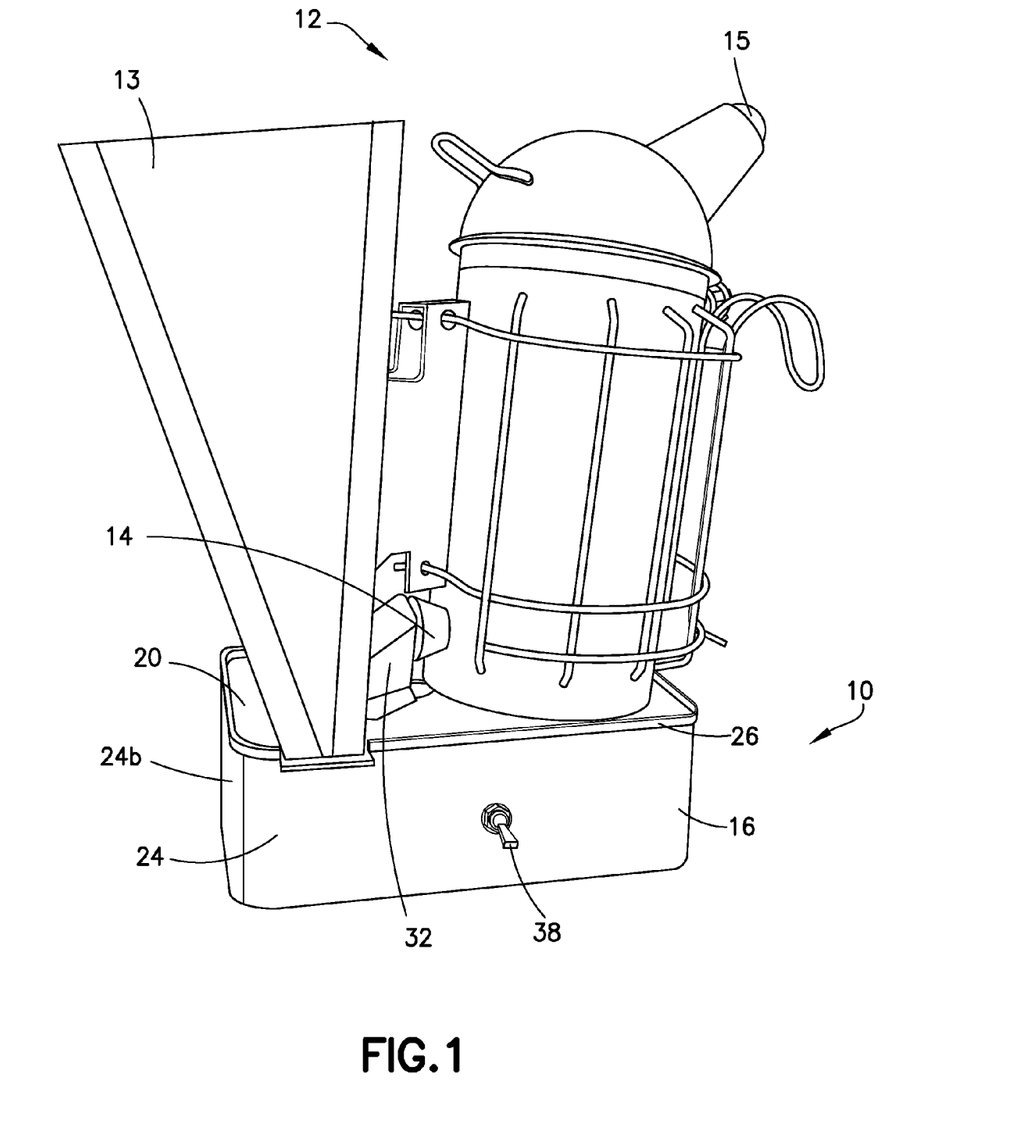
FIG. 1 is a side perspective view of an air directing assembly and beekeeping smoker assembly according to exemplary embodiments of the present disclosure.
Figure 2:
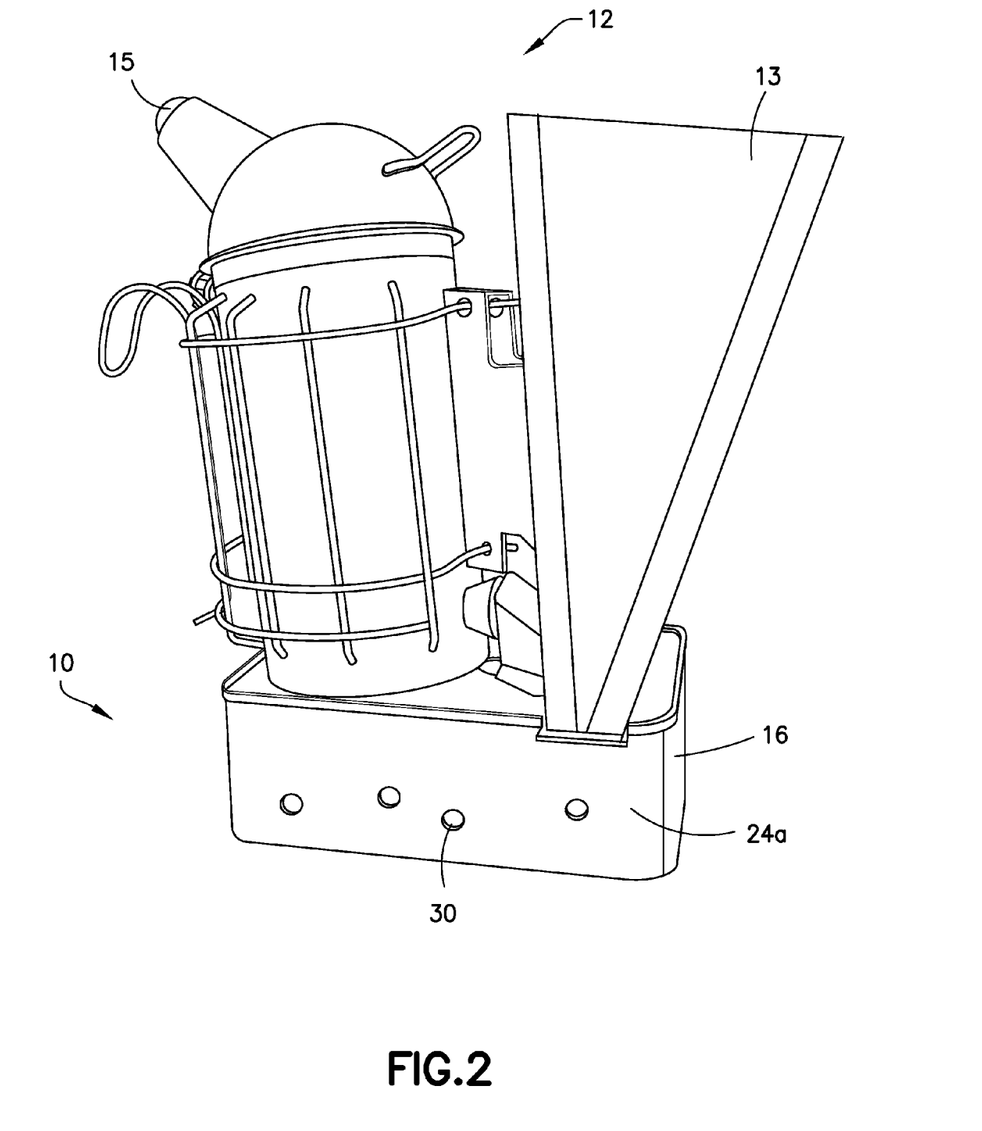
FIG. 2 is another side perspective view of the assemblies of FIG. 1.

With reference to the drawings, and in particular to FIGS. 1-6, there is illustrated an air directing assembly 10 depicting an embodiment of the present disclosure. In general, air directing assembly 10 is configured and dimensioned to be utilized in conjunction with a pre-existing smoker assembly 12 or the like for beekeeping purposes. As shown in FIGS. 1-2, smoker assembly 12 can be mounted with respect to air directing assembly 10 (e.g., for beekeeping purposes). However, it is noted that exemplary air directing assembly 10 is capable of use with other assemblies/systems or the like (e.g., other smoker assemblies or smoke providers) for other purposes (e.g., other insect keeping purposes or the like).

In exemplary embodiments, air directing assembly 10 can be mounted with respect to or associated with smoker assembly 12 so that smoke from smoker assembly 12 is provided to an insect hive or honeybee hive or the like. It is noted that assembly 10 can be mounted with respect to or associated with smoker assembly 12 using a variety of suitable techniques, as discussed further below.

In general and as discussed below, air directing assembly 10 provides or blows a constant, continuous and/or directed stream of air into and/or to smoker assembly 12, thereby providing an adequate and/or improved amount of smoke to the bees, which thereby keeps the bees calm when the hive is open by the user. Air directing assembly 10 can prevent the fire in smoker assembly 12 from going out, and assembly 10 can replace the pump/bellows 13 typically associated with smoker assembly 12. In general, the pump/bellows 13 of smoker assembly 12 needs to be constantly pumped, otherwise the fire in the smoker assembly 12 can go out. In exemplary embodiments, air directing assembly 10 can be modified to mount with respect to and/or be utilized with a wide variety of smoker assemblies 12.

As shown in FIGS. 1-2, smoker assembly 12 typically includes an air inlet 14 and a smoke outlet 15. Exemplary smoker assembly 12 typically includes housing means to house flammable material (e.g., wood chips, burlap, cloth, paper, etc.) or the like for smoke providing purposes.

In exemplary embodiments and as shown in FIGS. 1-6, air directing assembly 10 includes a housing 16. Exemplary housing 16 takes the form of a substantially rectangular housing member or the like, although the present disclosure is not limited thereto. Rather, housing 16 may take a variety of forms, and be fabricated from a variety of materials. Exemplary housing 16 is fabricated from a heat resistant material or the like (e.g., metal, plastic, etc.).

In general, housing 16 is configured and dimensioned to house an air moving member 18 (e.g., fan 18) and/or to allow air to pass therethrough for air-directing purposes. It is noted that housing 16 may be configured and dimensioned to house any suitable air moving member 18 for air-directing purposes.

In exemplary embodiments and as shown in FIGS. 1-6, housing 16 includes an upper wall 20 having a top surface and a bottom surface, the upper wall 20 having an aperture 22 extending through the top and bottom surfaces. Housing 16 also includes at least one side wall 24 extending from the upper wall 20 to a position below the bottom surface of the upper wall.

In exemplary embodiments, housing 16 includes four side walls 24, 24a, 24b and 24c that extend from the upper wall 20, the four side walls 24, 24a, 24b and 24c defining a substantially rectangular side wall arrangement of housing 16. However, it is to be noted that housing 16 can take a variety of suitable shapes (e.g., circular, triangular, polygonal), and can include any suitable number of walls 24, 24a, etc.

In certain embodiments and as shown in FIGS. 1-2, upper wall 20 is configured and dimensioned to allow at least a portion of the smoker assembly 12 to be mounted thereon. In some embodiments, side walls 24 and 24a extend from the upper wall 20 to a position above the top surface of the upper wall 20 to define a top-side extending portion 26 and 26a, respectively, with each top-side extending portion 26, 26a including at least one groove or recess 28 configured and dimensioned to allow at least a portion of the smoker assembly 12 to be mounted or housed therein (e.g., bellows 13 housed in grooves 28).

Figure 3:
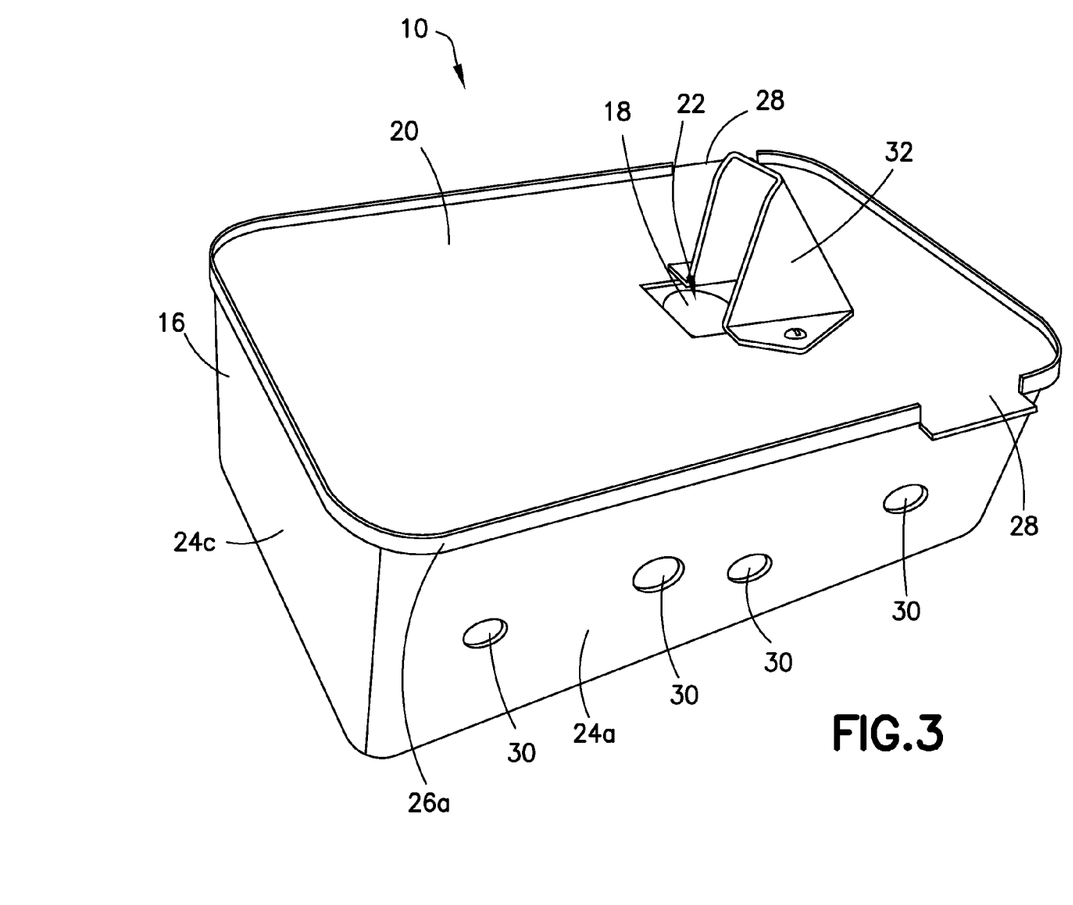
FIG. 3 is another side perspective view of the air directing assembly of FIG. 1.
Figure 4:
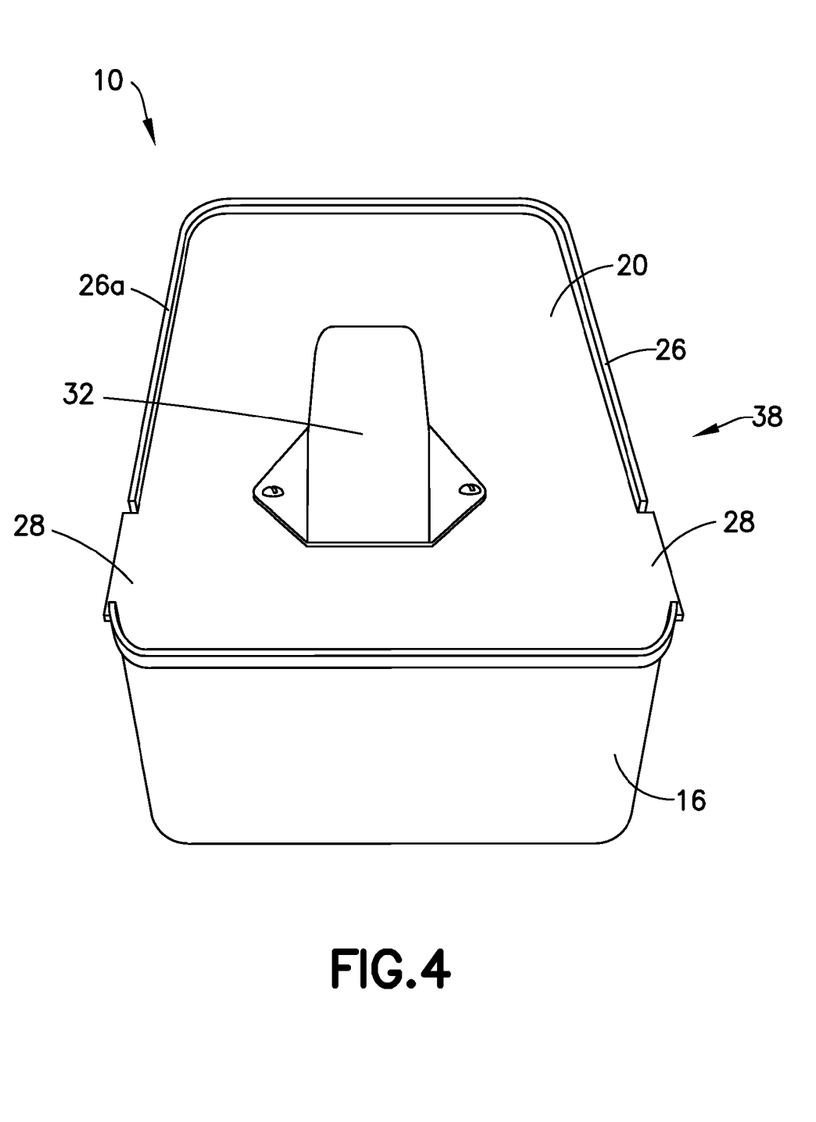
FIG. 4 is a rear perspective view of the air directing assembly of FIG. 1.
Figure 5:
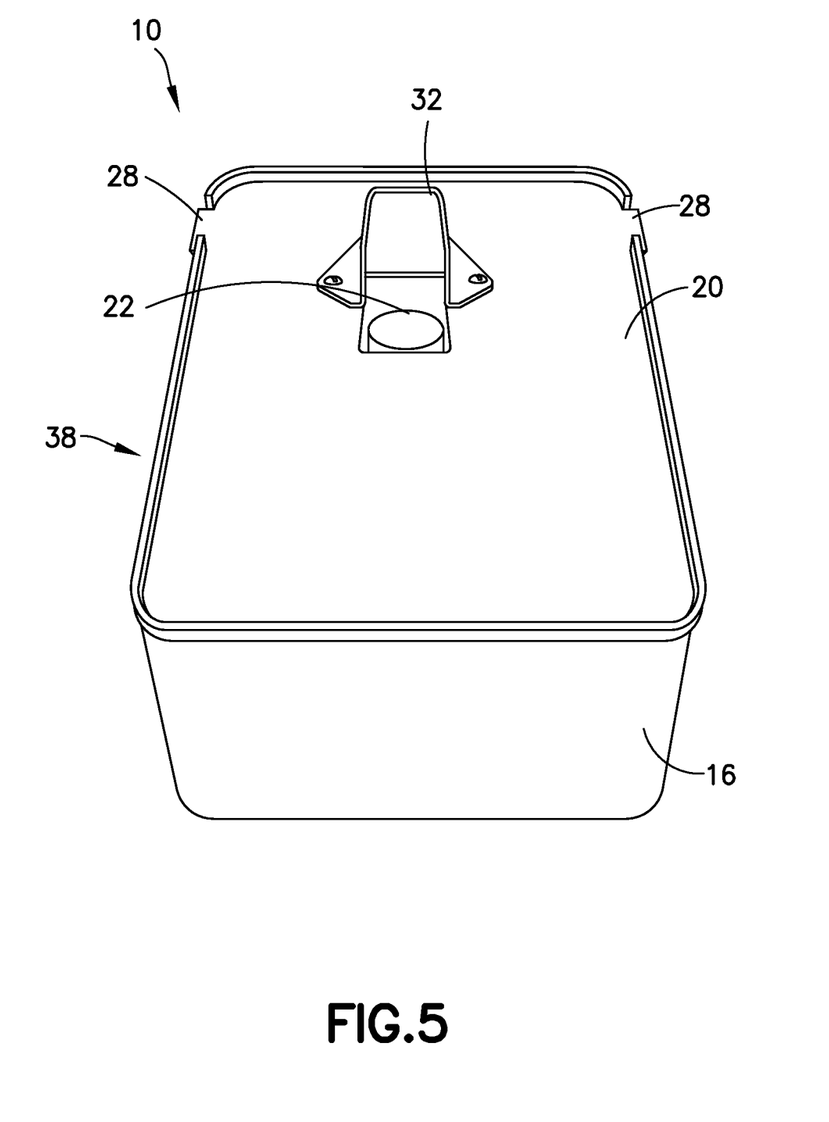
FIG. 5 is a front perspective view of the air directing assembly of FIG. 1.

In exemplary embodiments, at least one side wall 24, 24a, 24b and/or 24c includes one or more holes or apertures 30 therethrough for air drawing/providing/venting purposes (e.g., for providing air to air moving member 18 housed in housing 16). In one embodiment and as shown in FIG. 3, side wall 24a includes four holes 30. As such, housing 16 typically includes at least one hole 30. In exemplary embodiments, housing 16 includes a plurality/array of holes 30. It is noted that housing 16 can include any suitable number of holes 30.

In general, housing 16 typically includes air chute member or air deflector member 32 mounted with respect to the top surface of the upper wall 20, with the air chute member 32 mounted proximal to the aperture 22 of the upper wall 20. In general, air chute member 32 is configured and dimensioned to provide/direct/deflect a directed stream of air (e.g., from air moving member 18) to smoker assembly 12 (e.g., to air inlet 14 of smoker assembly 12) for beekeeping purposes, as noted above.

Exemplary air chute member 32 takes the form of a substantially triangular air chute member 32, although the present disclosure is not limited thereto. Rather, it is noted that air chute member 32 can take a variety of shapes, and can be fabricated from a variety of materials, for air-directing purposes. It is noted that air chute member 32 can extend a variety of distances from upper wall 20 of housing 16, and/or can be angled to have a variety of suitable angles/deflections for air-directing purposes. It is also noted that air chute member 32 (and aperture 22) could be positioned/mounted on a variety of other positions on housing 16 (e.g., on any side wall 24, 24a, 24b and/or 24c, etc.) for air-directing purposes.

In general, housing 16 typically includes and/or houses air moving member 18. In exemplary embodiments, air moving member 18 is mounted with respect to the bottom surface of the upper wall 20, with the air moving member 18 mounted proximal to the aperture 22 of the upper wall 20. In general, air moving member 18 is configured and dimensioned to provide a stream of air through the aperture 22 and to the air chute member 18, for air-directing purposes to smoker assembly 12.

As noted above, exemplary air moving member 18 takes the form of a fan (e.g., about 1.5 square-inch fan, powered by a 9-volt battery), although the present disclosure is not limited thereto. In certain embodiments, air moving member 18 is a 12-volt fan or the like.

Figure 6:
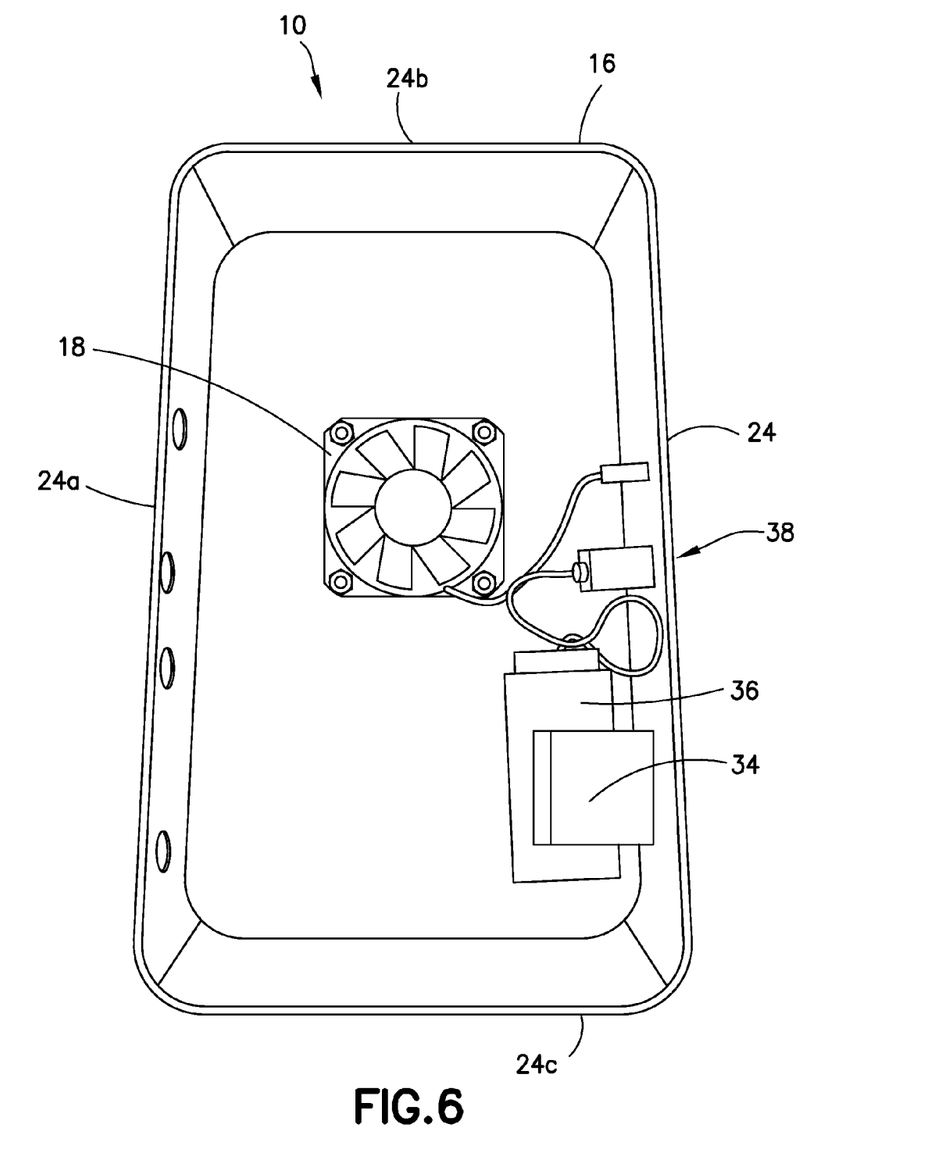
FIG. 6 is a bottom view of the air directing assembly of FIG. 1.

In certain embodiments and as shown in FIG. 6, the inner surface of one of the side walls 24, 24a, 24b and/or 24c (or the bottom surface of upper wall 20) includes a mounting member 34 that is configured and dimensioned to releasably secure or house a power source 36 (e.g., a battery 36). In exemplary embodiments, power source 36 takes the form of a 9-volt battery or the like, although the present disclosure is not limited thereto.

In some embodiments and as shown in FIG. 6, the power source 36 is mounted with respect to the air moving member 18, and is configured and adapted to provide power to the air moving member 18. As shown in FIGS. 1 and 6, assembly 10 can also include a power switch 38 (e.g., mounted with respect to the housing 16), the power switch 38 configured and adapted to control power to the air moving member 18. In one embodiment, housing 16 is about 2 inches in height, about 7 to 8 inches in length, and about 4 to 5 inches in width, although the present disclosure is not limited thereto. Rather housing 16 can take a variety of shapes and/or sizes.

As noted above, air directing assembly 10 is configured to be utilized in conjunction with a pre-existing smoker assembly 12 or the like for beekeeping purposes. In short, smoker assembly 12 can be mounted with respect to air directing assembly 10 for beekeeping purposes. Air directing assembly 10 can be mounted with respect to or associated with smoker assembly 12 so that smoke from smoker assembly 12 is provided to an insect hive or honeybee hive or the like. In general, air directing assembly 10 provides or blows a constant, continuous and/or directed stream of air into and/or to smoker assembly 12, thereby providing an adequate and/or improved amount of smoke to the bees, which thereby keeps the bees calm when the hive is open by the user. Air directing assembly 10 can prevent the fire in smoker assembly 12 from going out, and assembly 10 can replace the pump/bellows 13 typically associated with smoker assembly 12. In exemplary embodiments, air directing assembly 10 can be modified to mount with respect to and/or be utilized with a wide variety of pre-existing smoker assemblies 12.

Whereas the disclosure has been described principally in connection with air directing assemblies for use with beekeeping smoker assemblies or the like, such description has been utilized only for purposes of disclosure and is not intended as limiting the disclosure. To the contrary, it is to be recognized that the disclosed air directing assemblies are capable of use with other assemblies or systems or the like (e.g., for other insect smoker assemblies or the like).

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A beekeeping smoker assembly comprising:
a housing including: (i) an upper wall having a top surface and a bottom surface, the upper wall having an aperture extending through the top and bottom surfaces, (ii) at least one side wall extending from the upper wall to a position below the bottom surface, and (iii) at least one side wall extending from the upper wall to a position above the top surface to define a top-side extending portion, the top-side extending portion including at least one groove;
an air chute member mounted with respect to the top surface of the upper wall, the air chute member mounted proximal to the aperture of the upper wall, the air chute member including three walls that extend from the upper wall of the housing; and
an air moving member mounted with respect to the bottom surface of the upper wall, the air moving member mounted proximal to the aperture of the upper wall;
a smoker assembly having a flammable material housing that extends from a top end to a bottom end, the top end including a smoke outlet, and a bottom surface of the bottom end of the flammable material housing resting on top of the upper wall of the housing;
a pump connected to the flammable material housing, a bottom surface of a bottom end of the pump: (i) resting on top of the upper wall of the housing, and (ii) positioned within the at least one groove;
wherein the air moving member is configured and dimensioned to provide a stream of air through the aperture and to the air chute member;
wherein the air chute member is configured and dimensioned to provide a directed stream of air to an inlet of the smoker assembly, the inlet positioned on a side of the smoker assembly; and
wherein the smoker assembly is configured to operate independently away from the housing via continuous pumping of the pump.

2. The air directing assembly of claim 1, wherein the air moving member is a fan.

3. The air directing assembly of claim 1, wherein the housing includes four side walls that extend from the upper wall to a position below the bottom surface, the four side walls defining a substantially rectangular side wall arrangement.

4. The air directing assembly of claim 1, wherein the at least one side wall that extends from the upper wall to a position below the bottom surface includes one or more apertures therethrough.

5. The air directing assembly of claim 1, wherein an inner surface of the at least one side wall that extends from the upper wall to a position below the bottom surface includes a mounting member configured and dimensioned to releasably secure or house a power source.

6. The air directing assembly of claim 5 further comprising a power source releasably secured or housed with respect to the mounting member.

7. The air directing assembly of claim 6, wherein the power source is a battery.

8. The air directing assembly of claim 6, wherein the power source is a 9-volt battery; and
wherein the air moving member is a 12-volt fan.

9. The air directing assembly of claim 5, wherein the power source is mounted with respect to the air moving member and is configured and adapted to provide power to the air moving member.

10. The air directing assembly of claim 1, wherein the housing is fabricated from a heat resistant material.

11. The air directing assembly of claim 1 further comprising a power switch mounted with respect to the housing, the power switch configured and adapted to control power to the air moving member.

12. The air directing assembly of claim 1, wherein the smoker assembly is a beekeeping smoker assembly.

13. A method for directing air to a beekeeping smoker assembly comprising:
providing a housing having: (i) an upper wall having a top surface and a bottom surface, the upper wall having an aperture extending through the top and bottom surfaces, (ii) at least one side wall extending from the upper wall to a position below the bottom surface, and (iii) at least one side wall extending from the upper wall to a position above the top surface to define a top-side extending portion, the top-side extending portion including at least one groove;

mounting an air chute member with respect to the top surface of the upper wall, and mounted proximal to the aperture of the upper wall, the mounted air chute member including three walls that extend from the upper wall of the housing; and mounting an air moving member with respect to the bottom surface of the upper wall, and mounted proximal to the aperture of the upper wall;

resting a smoker assembly to on top of the upper wall of the housing, the smoker assembly having a flammable material housing that extends from a top end to a bottom end, the top end including a smoke outlet, and a bottom surface of the bottom end of the flammable material housing resting on top of the upper wall of the housing;

resting a pump connected to the flammable material housing on top of the upper wall of the housing, a bottom surface of a bottom end of the pump: (i) resting on top of the upper wall of the housing, and (ii) positioned within the at least one groove;

providing a stream of air via the air moving member through the aperture and to the air chute member;

providing a directed stream of air via the chute member to an inlet of the smoker assembly, the inlet positioned on a side of the smoker assembly; and wherein the smoker assembly is configured to operate independently away from the housing via continuous pumping of the pump.

14. The method of claim 13, wherein the air moving member is a fan.

15. The method of claim 13, wherein an inner surface of the at least one side wall that extends from the upper wall to a position below the bottom surface includes a mounting member configured and dimensioned to releasably secure or house a power source; and further comprising a power source releasably secured or housed with respect to the mounting member; and wherein the power source is mounted with respect to the air moving member and is configured and adapted to provide power to the air moving member.

16. The method of claim 15, wherein the power source is a 9-volt battery; and wherein the air moving member is a 12-volt fan.

17. The method of claim 13 further comprising a power switch mounted with respect to the housing, the power switch configured and adapted to control power to the air moving member; and wherein the smoker assembly is a beekeeping smoker assembly.

* * * * *